United States Patent [19]
Eden

[11] Patent Number: 5,333,420
[45] Date of Patent: Aug. 2, 1994

[54] RACK AND GEAR MODULAR ROOM EXTENDER

[75] Inventor: Edward J. Eden, Jackson, Mich.

[73] Assignee: Barker Manufacturing Co., Inc., Battle Creek, Mich.

[21] Appl. No.: 908,042

[22] Filed: Jul. 6, 1992

[51] Int. Cl.⁵ .................................... E04B 1/346
[52] U.S. Cl. .................................... 52/67; 52/64
[58] Field of Search .................................... 52/67, 69

[56] References Cited

U.S. PATENT DOCUMENTS

| | | | |
|---|---|---|---|
| 1,521,635 | 1/1925 | Lewis . | |
| 3,137,041 | 6/1964 | Mullen | 20/2 |
| 3,169,280 | 2/1965 | Jarman | 52/67 |
| 3,181,910 | 5/1965 | Thomas | 52/67 |
| 3,884,520 | 5/1975 | Peterson | 296/27 |
| 4,128,269 | 12/1978 | Stewart | 52/67 X |
| 4,133,571 | 1/1979 | Fillios | 296/23 |
| 4,253,283 | 3/1981 | May | 52/67 |
| 4,657,300 | 4/1987 | Penny et al. | 296/173 |
| 4,711,257 | 12/1987 | Kabayashi | 52/67 X |
| 5,154,469 | 10/1992 | Morrow | 52/67 X |

*Primary Examiner*—Carl D. Friedman
*Assistant Examiner*—Beth A. Aubrey
*Attorney, Agent, or Firm*—Beaman & Beaman

[57] ABSTRACT

A modular room extender for recreational vehicles, modular homes and the like utilizing a pair of axially displaceable slide rods having outer ends attached to the extendible room. The slide rods are mounted within a bracket which includes spaced parallel guides wherein the bracket slide rods and guides define a modular unit which may be installed as a complete assembly. The slide rod's inner ends are free and not connected to other structure, and a reversible electric motor operates a gear and rack system for extending and retracting the slide rods. A stamped metal rack of economical construction is attached to each slide rod.

8 Claims, 2 Drawing Sheets

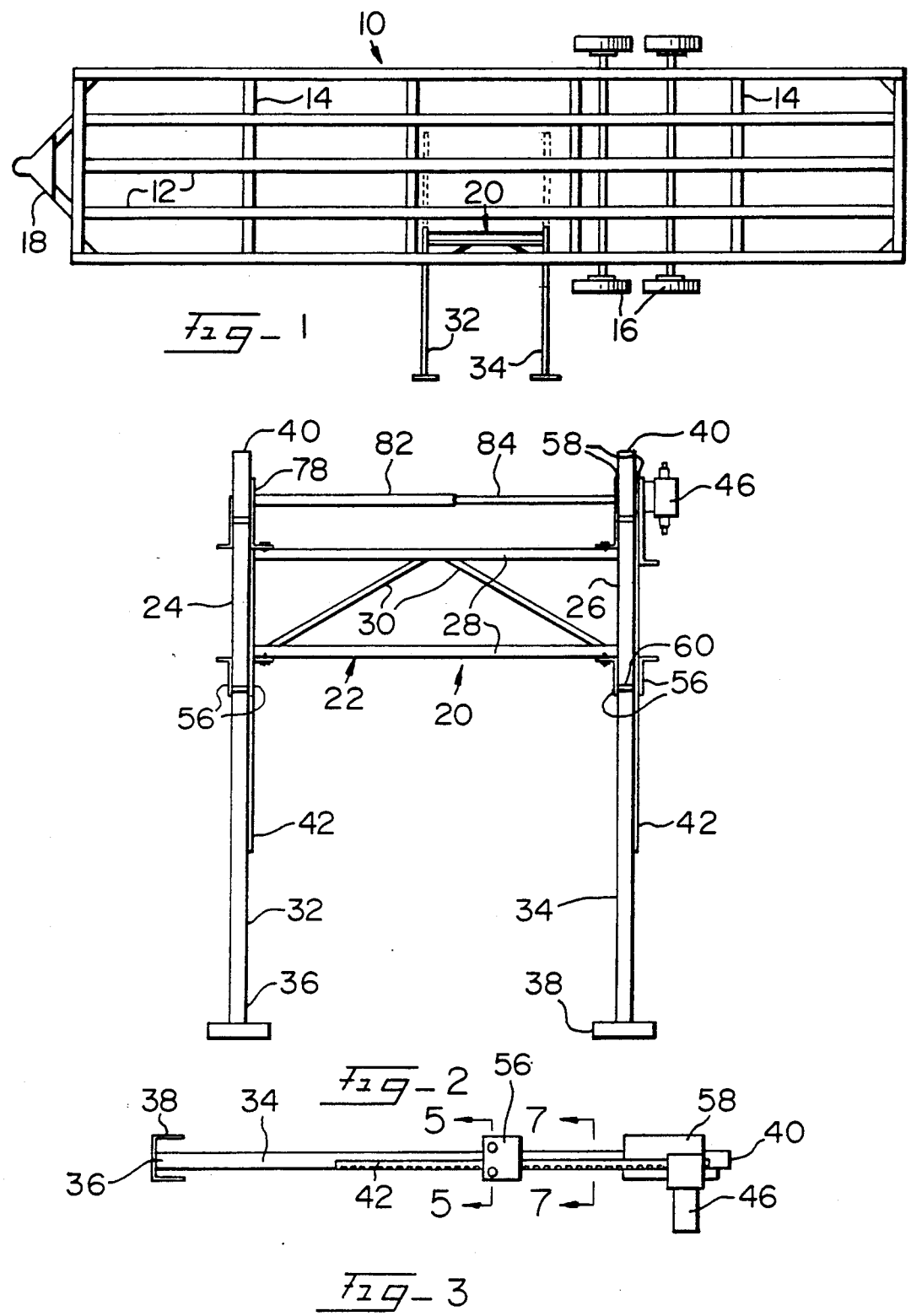

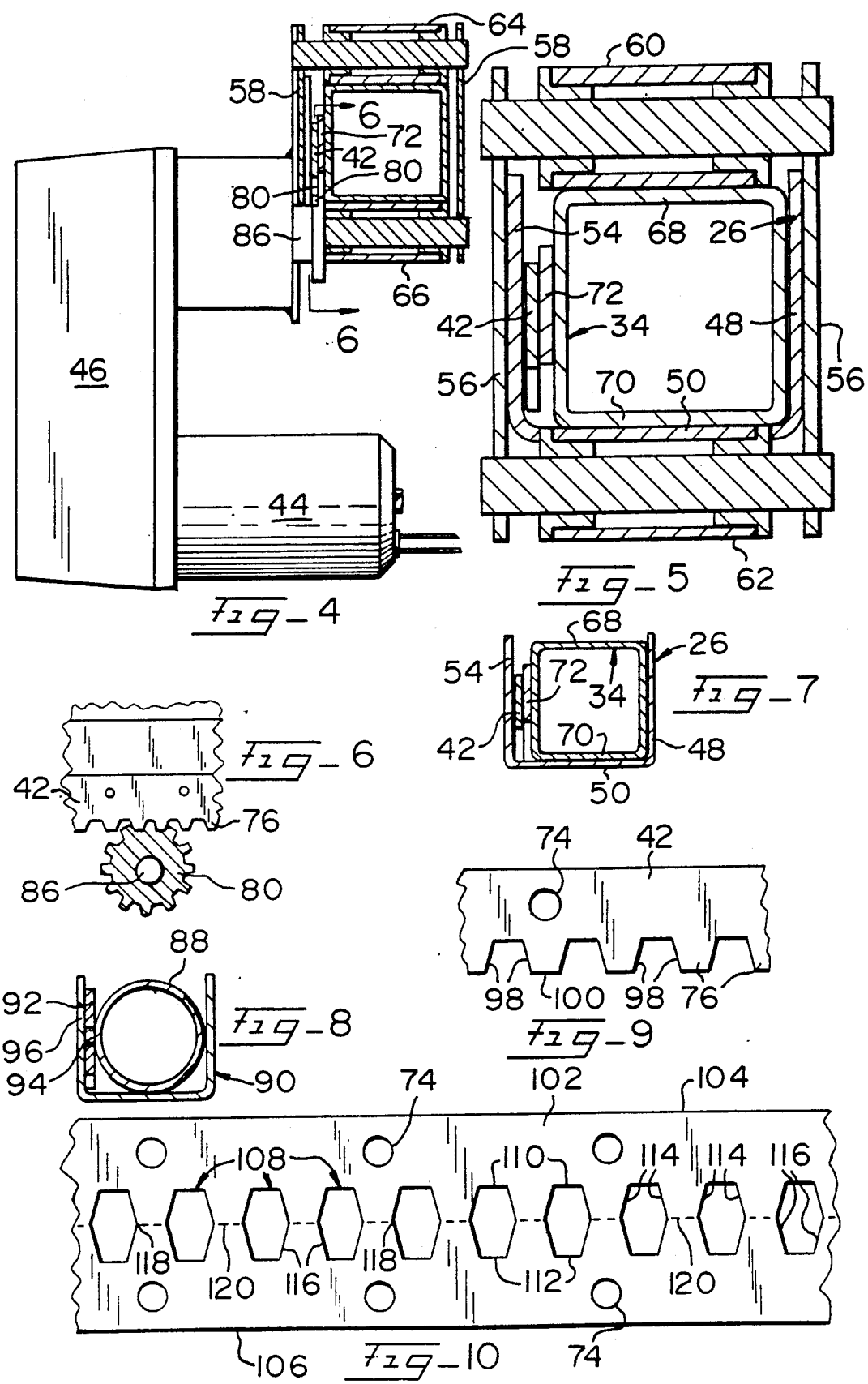

RACK AND GEAR MODULAR ROOM EXTENDER

BACKGROUND OF THE INVENTION

1. Field of the Invention

The invention pertains to room extenders such as used with recreational vehicles and modular homes wherein the room extender unit constitutes a complete pre-assembled module for simplifying installation.

2. Description of the Related Art

For many years, the living space of trailers, recreational vehicles, modular homes, and the like, has been increased by the utilization of room extenders, i.e. designing a room which may be extended from the primary housing structure to increase the usable interior space, and retracting the room into the primary structure to reduce its dimensions for highway transport purposes.

A wide variety of operating mechanisms have been employed to extend the rooms of transportable housing structures, and such mechanisms may be manually operated, hydraulically operated, or mechanically actuated. The mechanically actuated room extender mechanism may utilize screws or rack and gear systems for translating the room structure.

The instant invention pertains to a modular room extender particularly suitable for rack and gear operation, and the invention defines improvements over known rack and gear room extenders such as illustrated in U.S. Pat. Nos. 1,521,635; 3,137,041; 3,884,520; 4,133,571; and 4,657,300. A problem with room extenders of the above type results from the fact that the extending mechanism, while it may consist of a plurality of retractable and extendible elements, are custom constructed and installed, and installation is expensive and time consuming.

Another deficiency with prior art room extenders results from the interconnecting of the inner ends of the extendible elements whereby the room extender limits clearance for vehicle floor installed equipment, such as heating and air conditioning ducts, plumbing and wiring.

Room extenders presently available, because of their custom installation procedures, cannot readily be installed in complete assembled sets, and require installation by skilled craftsman capable of fitting each extender unit to its associated room structure.

SUMMARY OF THE INVENTION

It is an object of the invention to provide a modular room extender which, in itself, constitutes a complete assembly for installation into the associated vehicle, and may be properly installed without requiring extraordinary skills.

Another object of the invention is to provide a modular room extender constituting a complete assembly wherein a plurality of modular extenders may be used together, and the installation of a plurality of modular extenders can be made without requiring special skills.

Yet another object of the invention is to provide a modular room extender utilizing a pair of spaced parallel sliding rods capable of being extended and retracted, and wherein the inner ends of the sliding rods are free and not interconnected permitting maximum use of the vehicle floor area and minimizing clearance problems with air control ducts, plumbing and electrical wire.

A further object of the invention is to provide a modular room extender assembly utilizing slidable rods wherein the rods are displaced by rack and gear drives powered by a reversible electric motor.

Another object of the invention is to provide a rack and gear type modular room extender wherein the extender utilizes sliding rods supported within channel shaped guides, and the guides incorporate rollers engaging the sliding rods to minimize friction and reduce the power requirements for room extension and retraction.

Yet another object of the invention is to provide a rack and gear modular room extender utilizing an elongated toothed rack wherein a rack having accurately formed teeth is formed by an economical stamping process.

In the practice of the invention, the modular room extender includes a support bracket adapted to be mounted within the floor of a recreational vehicle, such as a trailer or motor home, or could be mounted in the floor of a modular home transportable upon wheels. The bracket includes of a pair of parallel spaced U-shaped guides wherein each guide supports a sliding rod and utilizes rollers for engaging the rod to minimize friction. The sliding rods include outer ends which are attached to the room to be extended, and the inner ends of the rods are free, i.e. not interconnected, so as to be receivable within openings defined in the vehicle undercarriage and occupy a minimal space within the undercarriage when the sliding rods are retracted.

A rack formed of metal plate is welded to each of the sliding rods, and a gear is rotatably mounted upon each guide meshing with the associated rack. The gears are bi-directionally rotated by a reversible electric motor, and a drive shaft interconnecting the gears permits the single electric motor to rotate the gears in either direction to permit room extension and retraction.

Preferably, the racks welded to the sliding rods are formed by an economical stamping operation wherein an elongated blank of metal plate is centrally pierced to produce a plurality of linearly related evenly spaced openings having a configuration such that upon the openings being centrally sheared, the blank forms two rack portions having teeth more accurately formed at the rack edge than is possible if the teeth were directly stamped into the edge of a metal blank plate.

BRIEF DESCRIPTION OF THE DRAWINGS

The aforementioned objects and advantages of the invention will be appreciated from the following description and accompanying drawings wherein:

FIG. 1 is a plan view of a recreational vehicle frame or undercarriage illustrating a modular room extender in accord with the invention as installed, the extended position of the sliding rods being shown in full lines, while the retracted position of the rods being illustrated in dotted lines, FIG. 2 is a plan view of the modular room extender assembly of the invention, per se, FIG. 3 is a side elevational view of the room extender as taken from the right of FIG. 2, FIG. 4 is an enlarged elevational sectional view as taken through a guide illustrating the reversible electric motor and the drive gear, FIG. 5 is an enlarged elevational sectional view as taken through a channel guide along Section 5—5 of FIG. 3, FIG. 6 is an enlarged, detail, elevational sectional view illustrating the meshing of the gear and rack as taken along Section 6—6 of FIG. 4, FIG. 7 is an elevational sectional view take through the guide channel along Section 7—7 of FIG. 3, FIG. 8 is an elevational sectional view similar to FIG. 7 of another embodiment of the invention utilizing a cylindrical sliding rod, FIG. 9 is an elevational view of the gear rack, per se, and FIG. 10 is an elevational view of the blank used to form the gear rack after forming of the openings, and prior to the severing of the blank to define the exposed rack teeth.

DESCRIPTION OF THE PREFERRED EMBODIMENTS

In FIG. 1, a typical trailer type frame or undercarriage is illustrated at 10 such as would be used as a recreational vehicle or modular home. The frame 10 includes a plurality of longitudinally extending elements 12 connected to transversely disposed elements 14. The undercarriage elements are mounted upon wheels 16, and the trailer hitch is represented at 18.

If it is desired to include a laterally extendible room upon the frame or undercarriage 10, the room extender assembly 20 is mounted to the undercarriage and becomes a permanent part of the vehicle. A modular gear and rack room extender 20 in accord with the invention is shown in its entirety in FIGS. 2 and 3.

The modular room extender in accord with the invention constitutes a unitary assembly which includes the support bracket 22. The support bracket consists of a pair of channel type guides 24 and 26 maintained in spaced parallel relationship by braces 28 reinforced by diagonals 30. Elongated slide rods 32 and 34 are supported within the guides 24 and 26, respectively, for longitudinal displacement therein, and the slide rods each include an outer end 36 having a bracket 38 mounted thereon for attachment to the room to be extended, not shown, and the slide rods also each include a free inner end 40. It is to be noted that the slide rod's inner ends 40 are not interconnected. Each of the slide rods 32 and 34 has an elongated gear rack 42 welded thereto, and gears rotatably supported on the channel guides meshes with each rack for bi-directional rotation through a reversible electric motor 44, FIG. 4, and its associated transmission 46. Depending on the direction of rotation of the motor 44, the slide rods 32 and 34 will be extended as shown in the full line position of FIG. 1, or retracted to the dotted line position of FIG. 1 when the vehicle room is to be retracted into the vehicle structure during transportation.

The details of construction of the guides is best shown in FIGS. 4-7. The primary component of the guides is the U-shaped channel 48 having a base 50, and perpendicularly disposed sides 52 and 54. Plates 56 are welded to the outer ends of the channels 48, FIG. 3, while plates 58 are welded to the inner ends of the channels, and an upper roller 60 and a lower roller 62 are rotatably mounted upon the outer end plates 56 for rotation thereon. In a similar manner, upper roller 64 and lower roller 66 are rotatably supported upon the inner end plates 58. The upper rollers 60 and 64 engage the upper edge of the associated slide rod, while the lower rollers 62 and 66 are positioned to engage the lower edge of the slide rods.

In the embodiment of FIGS. 1-7, the slide rods 32 and 34 constitute square box beams, FIG. 5, having an upper side 68 engaged by the rollers 60 and 64, and a lower side 70 engaged by the rollers 62 and 66. As the inner rollers 64 and 66 are substantially spaced from the outer rollers 60 and 62, the weight of the extended room is borne by the rollers 62 and 64, and the relatively close relationship between the rollers and the slide rod box beams permits the extended room to be properly mechanically supported.

The gear rack 42 is welded to a side of each slide rod box beam through in intermediary plate 72 attached to the box beam. The racks 42 are formed of a plate sheet metal, as described below, and are of a length as will be appreciated from FIGS. 2 and 3. The racks include holes 74 permitting the racks to be welded to the plate 72, and the lower edge of the rack is provided with teeth 76 for engagement with the associated gear, FIG. 6.

The gears 78 and 80, associated with the racks 42, are mounted upon drive shaft elements 82 and 84, telescopingly interconnected, which are rotatably supported within the guide inner plates 58. The drive shaft element 84 is rotated by the drive shaft 86 extending from the motor transmission 46 wherein rotation of the motor 44 in either direction will cause the drive shaft elements and associated gears 78 and 80 to rotate and thereby translate the slide rods 32 and 34 in the selected extended or retracted direction.

In the disclosed embodiment, the motor 44 and transmission 46 are illustrated as mounted exteriorly of the associated guide channel plates 58. It is to be understood that the motor 44 and transmission 46 could be mounted "inside" of the associated plate 58 locating the motor and transmission between the guide channels 24 and 26. In such instance, drive shafts would extend from both directions through the transmission 46 for association with the gears 78 and 80.

The use of the gear and rack drive in conjunction with the bracket 22 consisting of the guide channels 24 and 26 maintained in a spaced pre-assembled relationship by the braces 28 permits the entire assembly 20 to be handled and installed as a unit. If desired, a plurality of modular extender assemblies 20 may be mounted in a side by side relationship upon the vehicle frame if a large room is to be extended, and the modular assembly of the extender components simplifies installation, assures alignment of the slide rods, and eliminates many of the binding problems which previously existed with room extender operating mechanisms.

FIG. 8 illustrates a variation of a slide rod configuration wherein the slide rod takes the form of a cylindrical tube 88 slidably located within the channel guide 90. The rack 92 is constructed as in the previously described embodiment and is welded to a side of the tube 88 through hole 94, and as the plate configuration of the rack corresponds to the guide channel side 96, the presence of the rack 92 welded to the cylindrical slide rod 88 functions as a guide or way to maintain the proper orientation of the slide rod.

Preferably, the rack 42 or 92 welded to the slide rods is economically formed of a steel strip plate member having teeth 76 formed along the lower edge. The teeth 76 are defined by the sides 98 and the flat peak surface 100. While the rack configuration shown in FIG. 9 could be stamped with the teeth intersecting the edge of the rack body, such forming of the teeth is difficult if accuracy and surface quality is to be achieved. Accordingly, the racks attached to the slide rods are formed as illustrated in FIG. 10 and described below.

To form the racks 42 or 92, a blank 102 of plate material having edges 104 and 106 is placed within a stamping or punch press and a plurality of openings 108 are formed in the blank central region. Each of the openings 108 includes a base surface 110 and 112, and side surfaces 114 intersect base 110, and side surfaces 116 intersect base 112. The sides 114 and 116 disposed on a common side of an opening 108 intersect at an apex 118. The openings 108 are evenly spaced along the central region of the blank and the apices 118 of all of the openings are in alignment as to lie upon a common line. The weld holes 74 may also be punched into the blank at the same time as the openings 108 are formed therein.

After the blank 102 is formed as shown in FIG. 10, it is placed within a shearing die, not shown, and the blank is sheared along the dotted line 120 through the apices 118. Such shearing occurs without removal of metal from the blank 102 and results in the accurate formation of the gear teeth 76 as shown in FIG. 9 wherein the opening surfaces 114 and 116 become the teeth sides 98. In this manner, two racks are formed from each blank 102, and as the process can be rapidly produced on stamping equipment the formation of the racks is economical, and yet an accurate and structurally sound gear rack is achieved.

It is appreciated that various modifications to the inventive concepts may be apparent to those skilled in the art without departing from the spirit and scope of the invention.

I claim:

1. A pre-assembled modular extender for installation as a unit comprising, in combination, a support bracket adapted to be separately mounted as a unit upon primary support structure, said bracket including a pair of substantially parallel elongated spaced guides each having a longitudinal axis, reinforced braces transversely extending between and affixed to said guides maintaining said guides in a substantially rigid parallel spaced relationship and alignment, an elongated slide rod supported within each guide for axial movement therein, each slide rod having a free inner end and an outer end, a slide rod operator affixed to each slide rod, and a reversible slide rod actuator operatively connected to each slide rod operator for selectively translating the associated slide rod in a predetermined axial direction, whereby said support bracket comprises a separate structurally integral unit with respect to the primary support structure maintaining the assembly, rigidity and alignment of said spaced guides.

2. In a pre-assembled modular room extender as in claim 1, said slide rod operator comprising an elongated gear rack affixed to each slide rod, and said slide rod actuator comprising a gear meshing with each gear rack and drive means operatively associated with said gears for rotating said gears.

3. In a pre-assembled modular room extender as in claim 2, said drive means comprising a reversible electric motor.

4. In a pre-assembled modular room extender as in claim 3, a common drive shaft operatively interconnecting said electric motor with said gears.

5. In a pre-assembled modular room extender as in claim 1, each of said guides comprising a U-shaped channel having an inner end and an outer end, an upper roller transversely extending over said guide channel at each end thereof, a lower roller transversely related to the guide length located at each guide channel end below the adjacent upper roller, said rollers adapted to engage the slide rod located within the associated guide channel for the associated slide rod to facilitate axial movement thereof.

6. A pre-assembled modular extender for installation as a unit comprising, in combination, a support bracket adapted to be separately mounted as a unit upon primary support structure, said bracket including a pair of substantially parallel elongated spaced guides each having a longitudinal axis, reinforced braces transversely extending between and affixed to said guides maintaining said guides in a substantially rigid parallel spaced relationship and alignment, an elongated slide rod supported within each guide for axial movement therein, each slide rod having a free inner end and an outer end, an elongated gear rack affixed to each said slide rod substantially parallel thereto, a gear rotatably mounted on each said guide meshing with the rack attached to the slide rod within the associated guide, a reversible electric motor mounted on said support bracket and drive shaft means interconnecting said motor with said gears, whereby said support bracket comprises a separate structurally integral unit with respect to the primary support structure maintaining the assembly, rigidity and alignment of said spaced guides.

7. In a pre-assembled modular room extender as in claim 6, said drive shaft means comprising first and second telescopingly connected drive shaft elements.

8. In a pre-assembled modular room extender as in claim 6, each of said guides comprising a U-shaped channel having an inner end and an outer end, an upper roller transversely extending over said guide channel at each end thereof, a lower roller transversely related to the guide length located at each guide channel end below the adjacent upper roller, said rollers adapted to engage the slide rod located within the associated guide channel for the associated slide rod to facilitate axial movement thereof.

* * * * *